(12) United States Patent
Felty

(10) Patent No.: US 6,764,206 B1
(45) Date of Patent: Jul. 20, 2004

(54) SINGLE-BOLT AUXILIARY LIGHT BRACKET

(76) Inventor: Joel R. Felty, Headwinds Cycle Products 805 W. Hillcrest Blvd., Monrovia, CA (US) 91016

( * ) Notice: Subject to any disclaimer, the term of this patent is extended or adjusted under 35 U.S.C. 154(b) by 0 days.

(21) Appl. No.: 10/353,868

(22) Filed: Jan. 28, 2003

(51) Int. Cl.[7] .................................................. B60Q 1/00
(52) U.S. Cl. ...................................... 362/476; 473/549
(58) Field of Search ................................ 362/476, 473, 362/474, 396, 549; 280/288.4; 180/219

(56) References Cited

U.S. PATENT DOCUMENTS

| | | | | |
|---|---|---|---|---|
| 3,099,400 A | * | 7/1963 | Holmes | |
| 3,948,475 A | * | 4/1976 | Jones | 248/266 R |
| 4,320,906 A | * | 3/1982 | Saunders, IV | 280/289 S |
| 4,495,553 A | * | 1/1985 | Haynes | 362/311 |
| 4,565,384 A | * | 1/1986 | Dehnisch | 280/279 |
| 4,687,072 A | * | 8/1987 | Komuro | 180/219 |
| 5,418,696 A | * | 5/1995 | Izzo, Sr. | 362/72 |
| 5,595,441 A | * | 1/1997 | McGee | 362/250 |
| 5,727,864 A | * | 3/1998 | Stelling et al. | 362/72 |
| 6,036,339 A | * | 3/2000 | Idoeta | 362/476 |
| 6,158,279 A | * | 12/2000 | Saiki | 73/493 |
| 6,176,339 B1 | * | 1/2001 | Reichardt | 180/219 |

* cited by examiner

Primary Examiner—Alan Cariaso
Assistant Examiner—Jacob Y. Choi
(74) Attorney, Agent, or Firm—Steins & Associates, P.C.

(57) ABSTRACT

A Single-bolt Auxiliary Light Bracket is disclosed. The device provides a clean, sleek mounting apparatus for motorcycle auxiliary light fixtures. The device may further be provided in a variety of configurations to accomodate a variety of handlebar designs; in all embodiments, the bracket will attach to the existing motorcycle structure with a single bolt. The device is still further provided with recessed grooves formed in its surface for retaining headlamp wiring and other non-aesthetically-pleasing appurtances therewithin.

18 Claims, 8 Drawing Sheets

SINGLE-BOLT AUXILIARY LIGHT BRACKET

BACKGROUND OF THE INVENTION

1. Field of the Invention

This invention relates generally to motorcycle accessories and, more specifically, to a Single-bolt Auxiliary Light Bracket

2. Description of Related Art

Motorcycle accessory products have been, and continue to be, a large commercial market. It is rare for a motorcycle owner to simply purchase a motorcycle, and then leave it as-is without any change or improvement. This is particularly true in regards to the high-end, large street "cruiser" motorcycles. These street cruiser motorcycles tend to be very dressed up, and to display expansive amounts of chrome. It has become the source of great ownership pride to accessorize one's cruiser motorcycle with high quality accessory devices such as auxiliary lights. Auxiliary lights can be purchased in a wide variety of styles and for a wide variety of purposes on the motorcycle. Of particular popularity are the auxiliary headlights; these lights are typically mounted on either side of the main motorcycle headlight— here they provide additional beauty and safety. Before discussing how these auxiliary headlights have been attached in the past, we will first orient ourselves by discussing the main components of the fork area of a conventional street cruiser motorcycle.

FIG. 1 is a partial perspective view of a conventional motorcycle fork assembly 10. The conventional motorcycle has a left fork tube 12 and right fork tube 14 extending between the motorcycle frame (not shown) and the shock absorbers (which support the front wheel). Although not depicted, there is a steering stem that attaches the fork assembly 10 to the frame of the motorcycle. The steering stem is centered on the frame (and between the fork tubes 12 and 14), and enables the fork assembly to rotate back and forth to provide vehicle steering.

The fork tubes 12 and 14 and steering stem (not shown) on a street cruiser motorcycle are typically clamped together by an upper "triple clamp" 18 and a lower triple clamp 20. Typically also, the lower triple clamp 20 provides support for the main headlight assembly 22. The main headlight assembly 22 is attached to the lower triple clamp 20 by the main headlight mounting bolt 23 affixed therethrough. Now turning to FIG. 2, we can examine one example of a prior device and method for mounting auxiliary headlights to a motorcycle.

FIG. 2 is a partial perspective view of a prior accessory mounting bracket assembly 29 for motorcycle. The assembly 29 consists of a center mounting bracket 30 and a mounting bar 31 extending out and up from the center mounting bracket 30. The center mounting bracket 30 is attached to the top surface 22 of the lower triple clamp 20 by the main headlight mounting bolt 23; the mounting bracket 30 is "sandwiched" between the main headlight assembly 22 and the lower triple clamp 20. A first auxiliary headlight 32A and second auxiliary headlight 32B are attached to, and extend from the opposing distal ends of the mounting bar 31.

There are at least two problems with this prior assembly 22: (1) since it only has a single anchoring point to the lower triple clamp 20, it is not particularly rigid (and is therefore unstable); and (2) although not depicted here, the auxiliary headlights 32 require electrical wiring in order that they function—this assembly 29 leaves those wires out in the open and unprotected as they run between the auxiliary headlights 32 and the main headlight 22 (which is where they receive their power). Also, the prior assembly 22 is not particularly aesthetically pleasing. If we now turn to FIG. 3, we can examine yet another prior design.

FIG. 3 is an exploded perspective view of another prior accessory mounting bracket 40. In this simple design, the bracket 40 is designed to be attached directly to one of the fork tubes (see FIG. 1). The bracket 40 consists of a first bracket-half 42A and a second bracket-half 42B which are tightened together to clamp onto the fork tube (not shown). The bracket 40 has a mounting aperture 46 penetrating therethrough to accept the threaded mounting stud 30 that extends from the typical auxiliary headlight assembly 32. The assembly 32 then attaches to the bracket 40 by a mounting nut 38 and washer 39 engaging the stud 30. This prior design suffers from the same problems as the assembly described in FIG. 2, and has an even poorer aesthetic appearance.

What is needed is a method and device for attaching auxiliary headlights to motorcycles that is structurally dependable, aesthetically pleasing in its shape, as well as in providing a storage location for the power supply wiring leading to the auxiliary headlights.

SUMMARY OF THE INVENTION

In light of the aforementioned problems associated with the prior devices and methods, it is an object of the present invention to provide a Single-bolt Auxiliary Light Bracket and the method for installing the Bracket. The device should provide a clean, sleek mounting apparatus for motorcycle auxiliary light fixtures. The device should be provided in a variety of configurations to accomodate a variety of handlebar designs; in all embodiments, the bracket should attach with a single bolt to the existing motorcycle structure. The device should further be provided with recessed grooves formed in its surface for retaining headlamp wiring and other non-aesthetically-pleasing appurtances therewithin.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Single-bolt Auxiliary Light Bracket.

Figure 1:
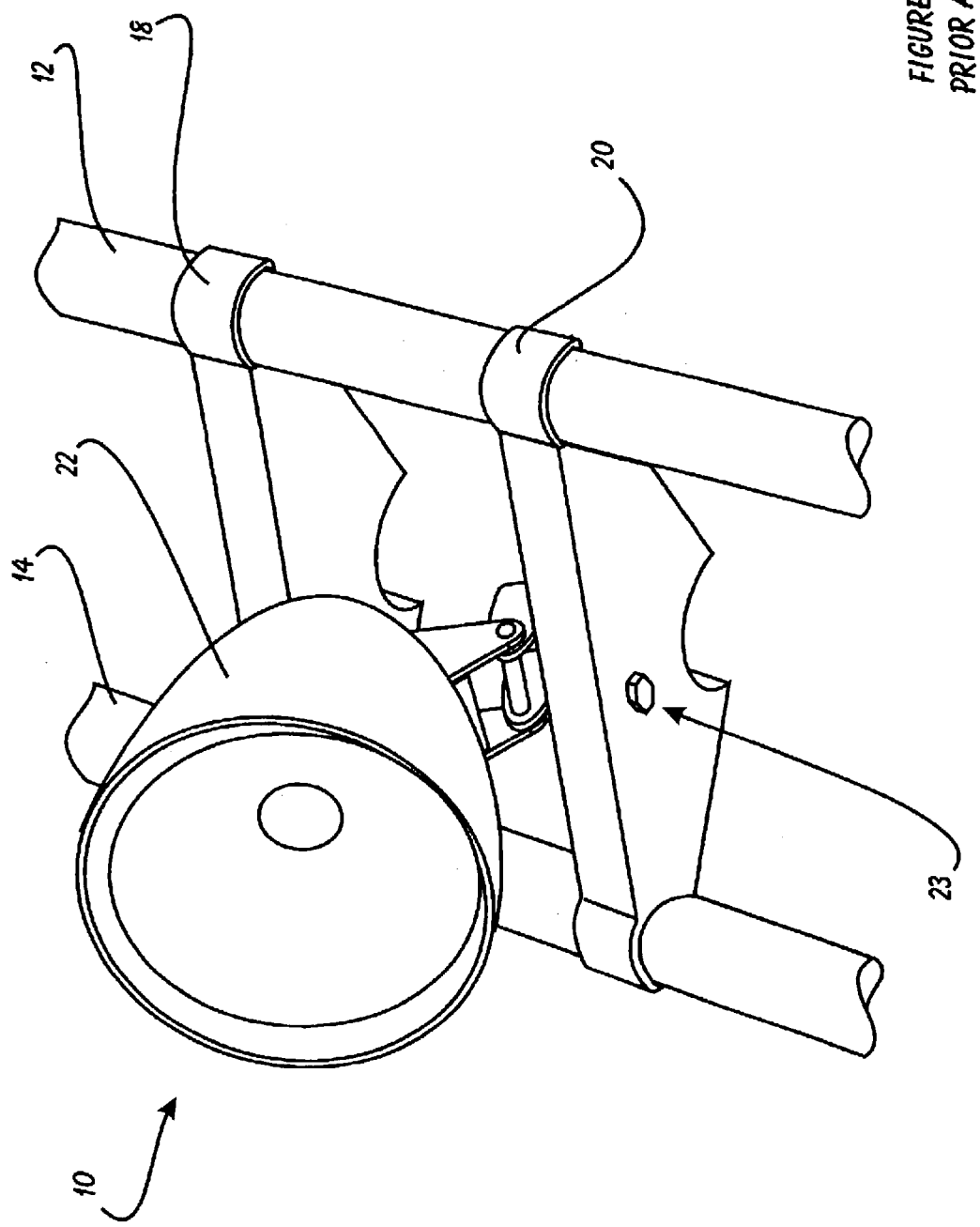
FIG. 1 is a partial perspective view of a conventional motorcycle fork assembly.
Figure 2:
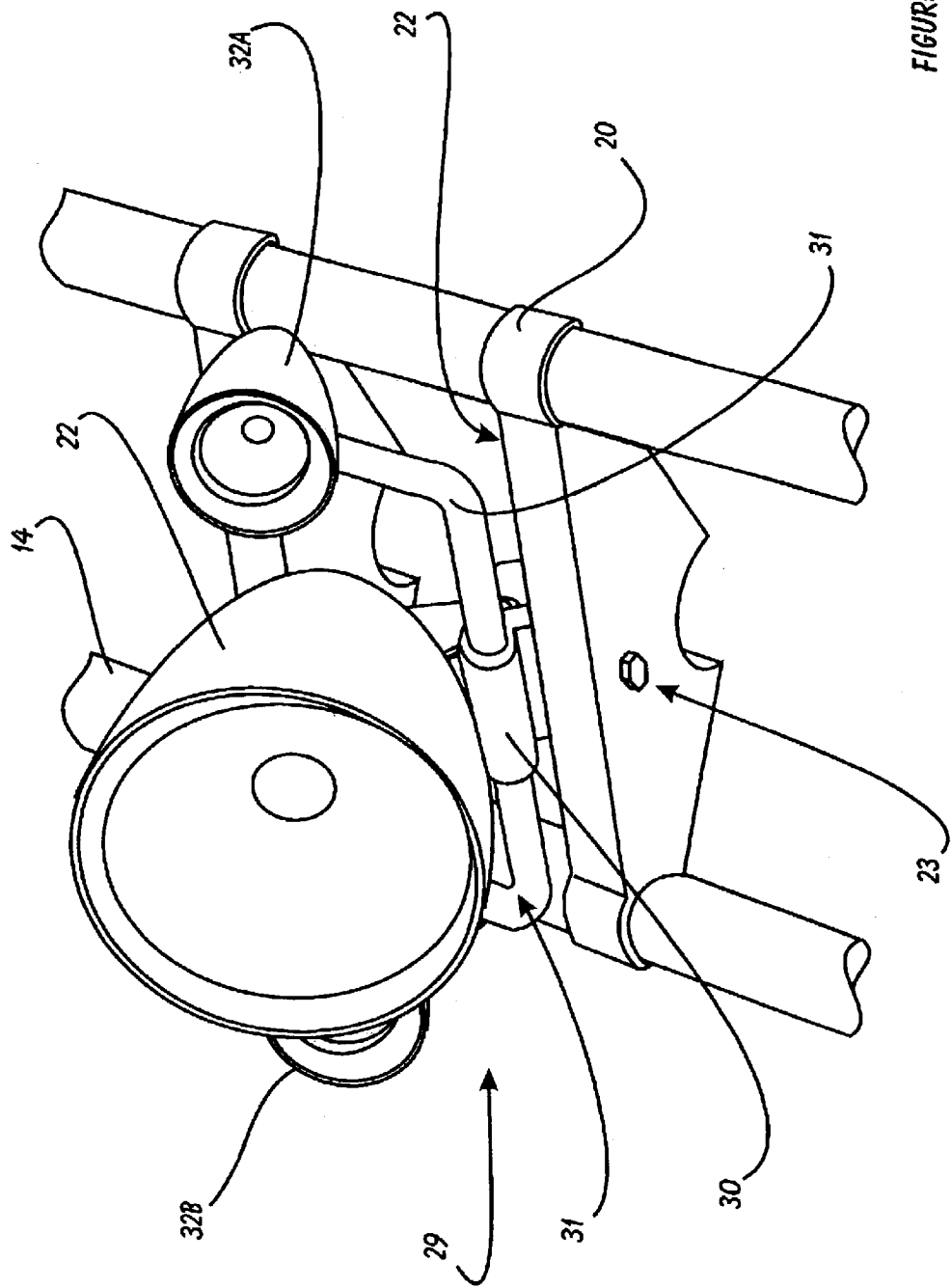
FIG. 2 is a partial perspective view of a prior accessory mounting bracket for motorcycles.
Figure 3:
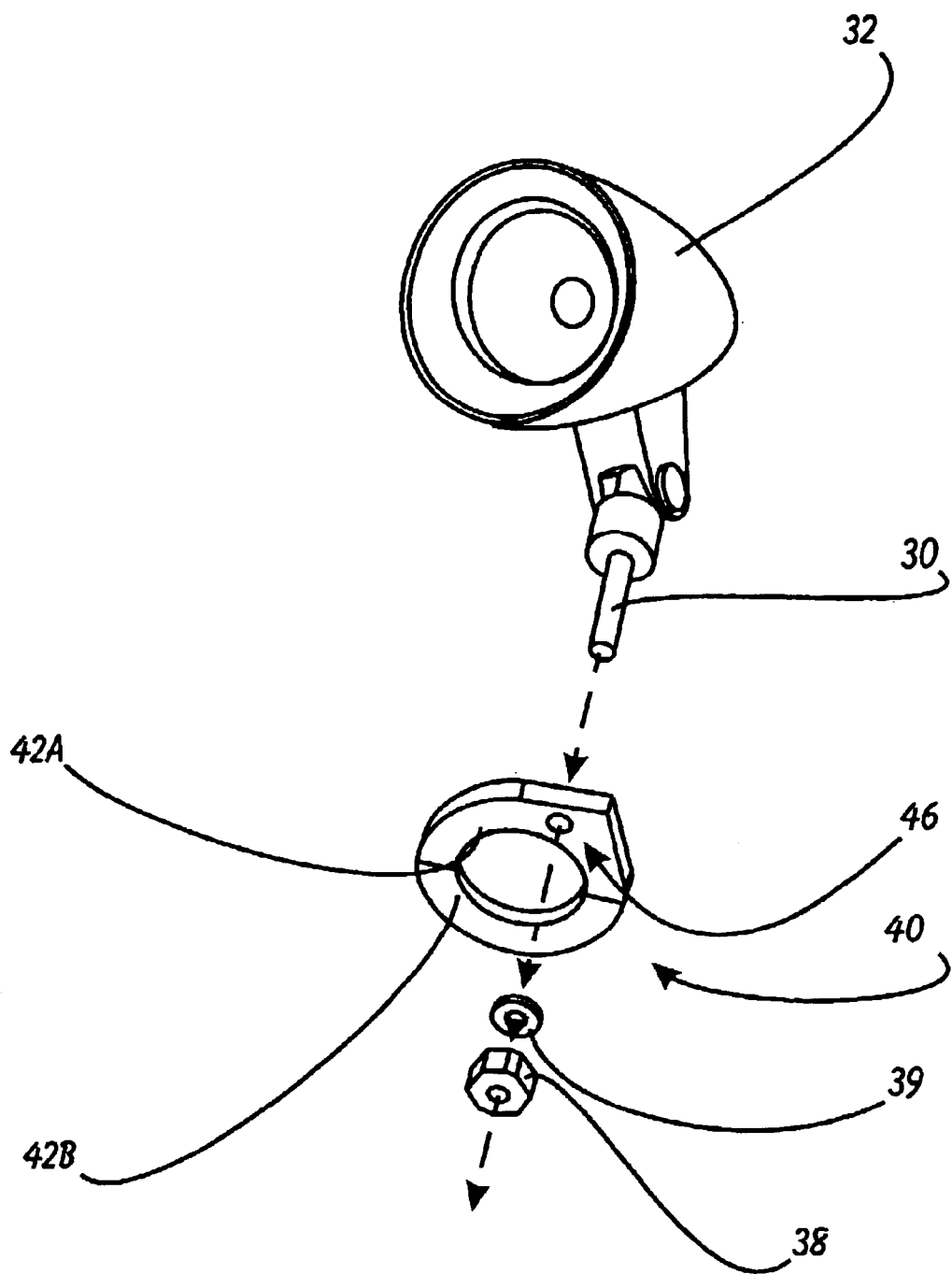
FIG. 3 is an exploded perspective view of another prior accessory mounting bracket.
Figure 4:
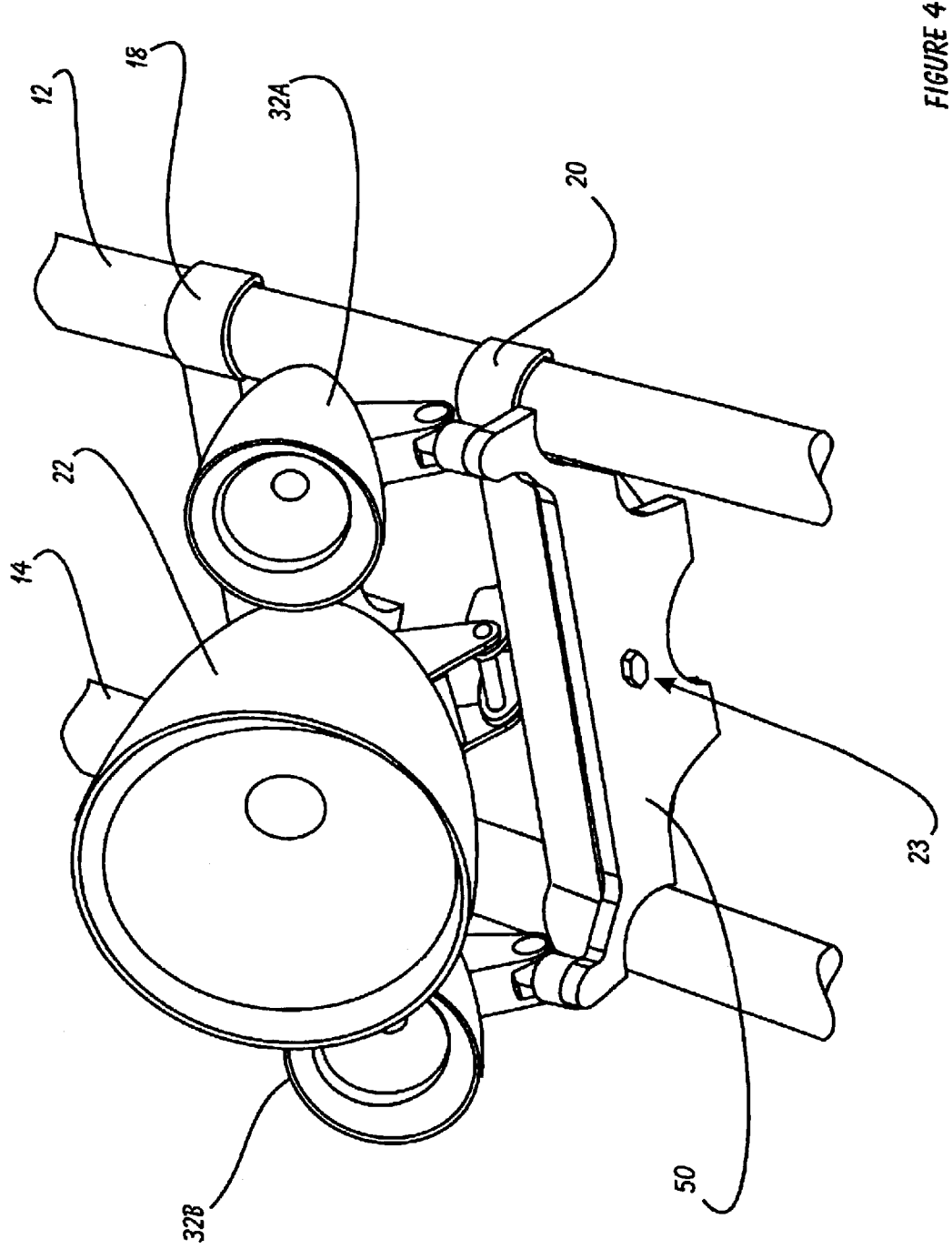
FIG. 4 is a partial perspective view of mounting bracket of the present invention installed on a conventional fork assembly.

The present-invention can best be understood by initial consideration of FIG. 4. FIG. 4 is a partial perspective view of mounting bracket 50 of the present invention installed on a conventional fork assembly. As shown, the bracket 50 attaches to the underside of the lower triple clamp 20 using the main headlight mounting bolt 23 (or, if necessary, a longer bolt in place of the original equipment mounting bolt). Unlike the prior brackets, the present invention extends between the two fork tubes 12 and 14, as well as the steering stem (not shown), similar to the triple clamps, in order to provide an extremely rigid and durable mounting platform for the auxiliary headlights 32. Furthermore, and as will be discussed below, the top surface (as installed here) of the bracket 50 includes a wire groove cut into it; the wire groove is provided to encase the electrical supply wiring for the auxiliary headlights as the wiring runs between the main headlight 22 and the auxiliary headlights 32. In addition to hiding the wiring, the bracket 50 presents a smooth, clean and polished surface on the bottom-side of the triple clamp 20. Although not depicted here, it should be understood that the bracket 50 can also be attached to the top or bottom surface of the upper triple clamp 18; this enables the user more options for installing auxiliary headlights, including the possibility of two pair of lights 32; one pair extending from a bracket 50 attached to the upper triple clamp 18 and one pair extending from a bracket 50 attached to the lower triple clamp 20. It should further be understood that the bracket 50 is attachable to either the top surface or the bottom surface of the triple clamp 18 or 20, depending upon the specific component arrangement on a particular motorcycle. If we turn now to FIG. 5, we can examine the present invention in more detail.

Figure 5:
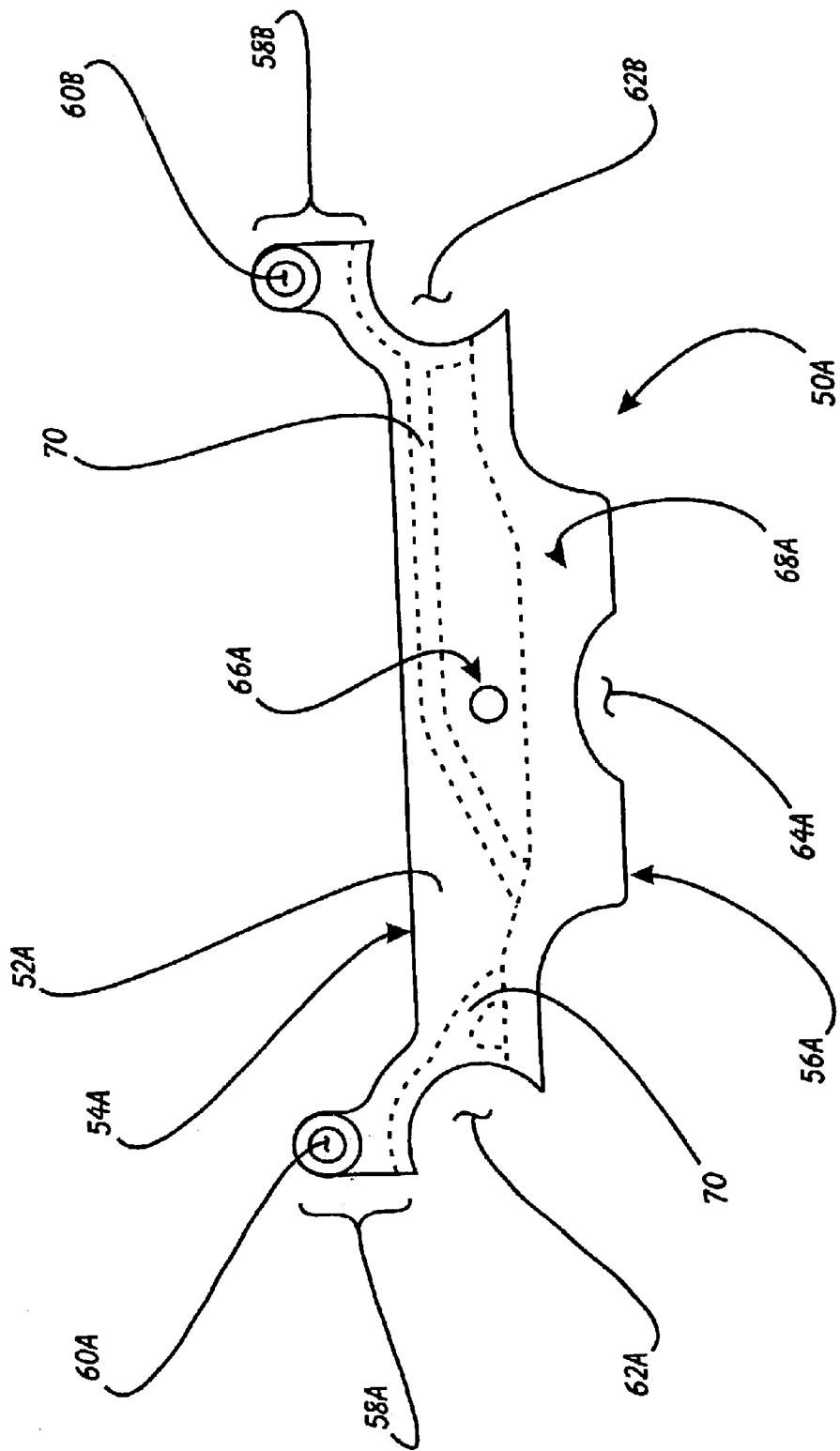
FIG. 5 is a top view of the bracket of FIG. 4.

FIG. 5 is a top view of the bracket 50 of FIG. 4. The first embodiment of the bracket 50A (as also depicted in FIG. 4) comprises a base 52A from which a pair of arms 58A and 58B extend. Each of the arms 58 is defined by a mounting aperture 60A and 60B for an auxiliary headlight. The base 52A is defined by a front face 54A which has a profile that preferably matches the profile of a triple clamp (see FIG. 4) on a popular model of street cruiser motorcycle. The base 52A further is defined by a rear face 56A having a plurality of arcuate sockets formed in its profile. At substantially the center of the rear face 56A is the steering stem socket 64A. The steering stem socket 64A is shaped an positioned to cooperate with the motorcycle's steering stem so that when the bracket 50A is mounted, the steering stem is received within the socket 64A to brace the bracket 50A thereagainst to provide additional rigidity to the attachment.

Two other arcuate sockets defining the rear face 56A are the left and right fork tube sockets 62A and 62B, respectively. Similar to the steering stem socket 64A, these sockets 62 are positioned and shaped to accept the respective motorcycle fork tubes therein when the bracket 50A is attached to the triple clamp (see FIG. 4). The combination of the mounting bolt (see FIG. 4) holding the bracket 50A to the triple clamp (see FIG. 4) and the sockets 62 and 64 housing their respective tubes creates rigidity in the attachment heretofore not offered with the e prior auxiliary light mounting brackets.

Centered on the base 52A is the bracket mounting aperture 66A disposed on the surface of the base 52A to cooperatively align with the existing headlight mounting bolt (see FIG. 4). A further novel aspect of the bracket of the present invention is the wire groove 70 depicted here by hidden lines to indicate that it is on the top surface of the bracket 50A. As shown, the wire groove 70 leads from the perimeter of the fork tube sockets 62 (directly adjacent to the arms 58, where the auxiliary lights are mounted). The wire groove 70 is on the top surface, leaving a smooth bottom surface 68A to the bracket, so that when the bracket 50A is installed, the exposed bottom surface 68A presents a clean and aesthetically pleasing package. As discussed above, it should be understood that the bracket 50A can be mounted upside-down against the top of the triple clamp (see FIG. 4), in certain applications; in these cases, the bottom surface 68A will actually be exposed on top of the mated bracket 50 and triple clamp (see FIG. 4). Now turning to FIG. 6, we can examine another embodiment of the present invention.

Figure 6:
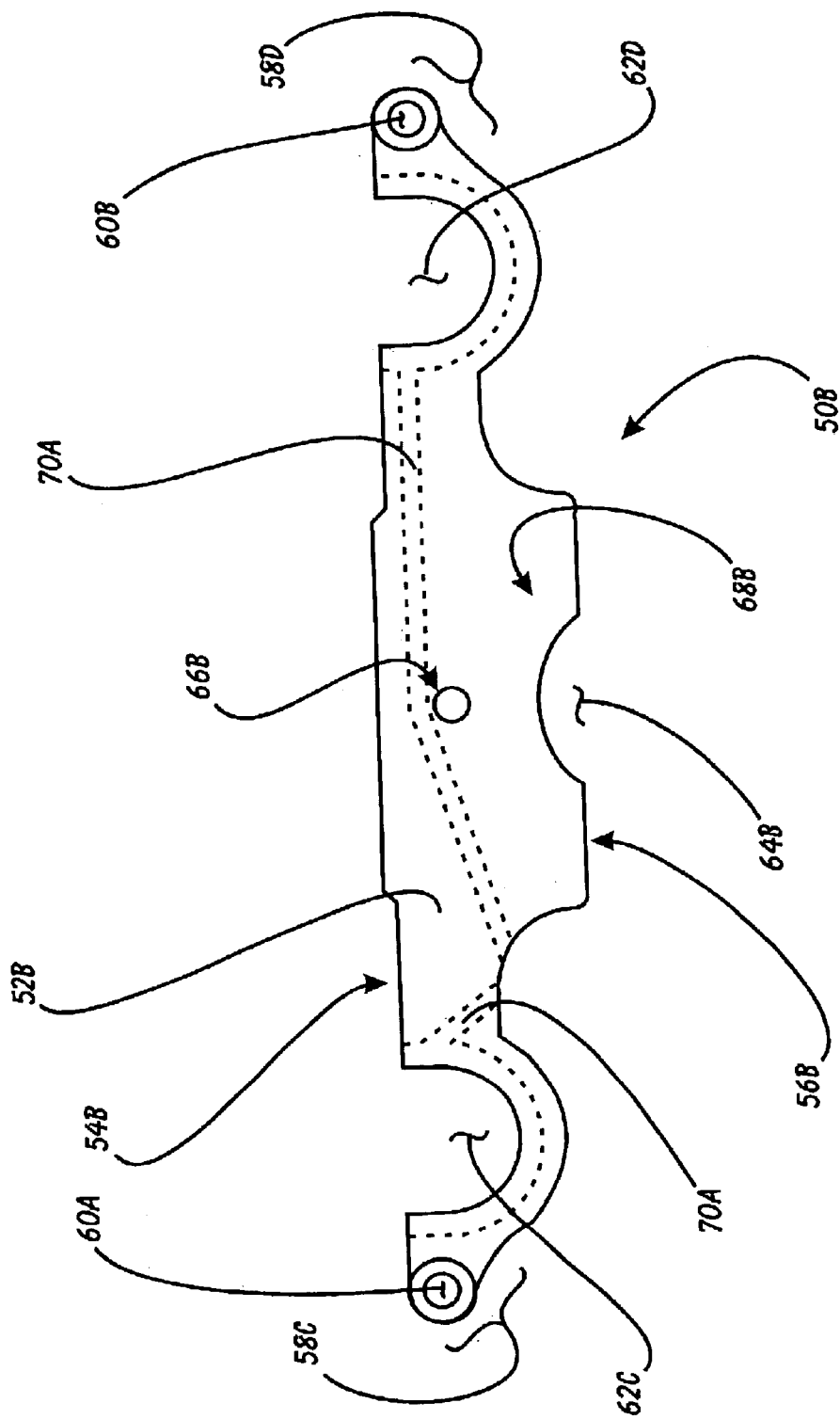
FIG. 6 is a top view of an alternate bracket of the present invention.

FIG. 6 is a top view of an alternate bracket 50B of the present invention. This embodiment is provided to be provide a slightly different appearance and mounting position for the auxiliary headlights (i.e. on the outer sides of the fork tubes rather than in front of the fork tubes); it can also be mounted to either the top or bottom surface of one of the triple clamps (see FIG. 4) using the mounting bolt for the main headlight (see FIG. 4).

As shown here, the right and left fork tube sockets 62D and 62C, respectively, are actually formed in the front face 54B of the base 52B. The steering stem socket 64B, however, is an arcuate portion formed in the rear face 56B of the base 52B. The bracket 50B defines a right and left arm 58D and 58C that extend outwardly to the right and left of the fork tube socket to which they are adjacent. Each of the arms 58 terminates in a auxiliary headlight mounting aperture 60 at its end in order to provide a location to bolt the auxiliary headlight to. As should be apparent, the location of these mounting apertures 60 relative to the fork tubes (once they reside within the sockets 62) dictates that the auxiliary lights (see FIG. 4) will be located on the far outer sides of the fork tubes, providing a look that is slightly different from that shown in FIG. 4.

Furthermore, as is also shown, the wire groove 70A traces a slightly different path than the wire groove of the bracket of FIG. 5 due to the repositioning of the sockets 62, arms 58 and apertures 60; similar to the bracket of FIG. 5, the wire groove 70A runs between the perimeter of the fork tube sockets 62D to the vicinity of the rear face 56B of the base 52B. Finally, turning to FIG. 7, we can examine another embodiment of the present invention.

Figure 7:
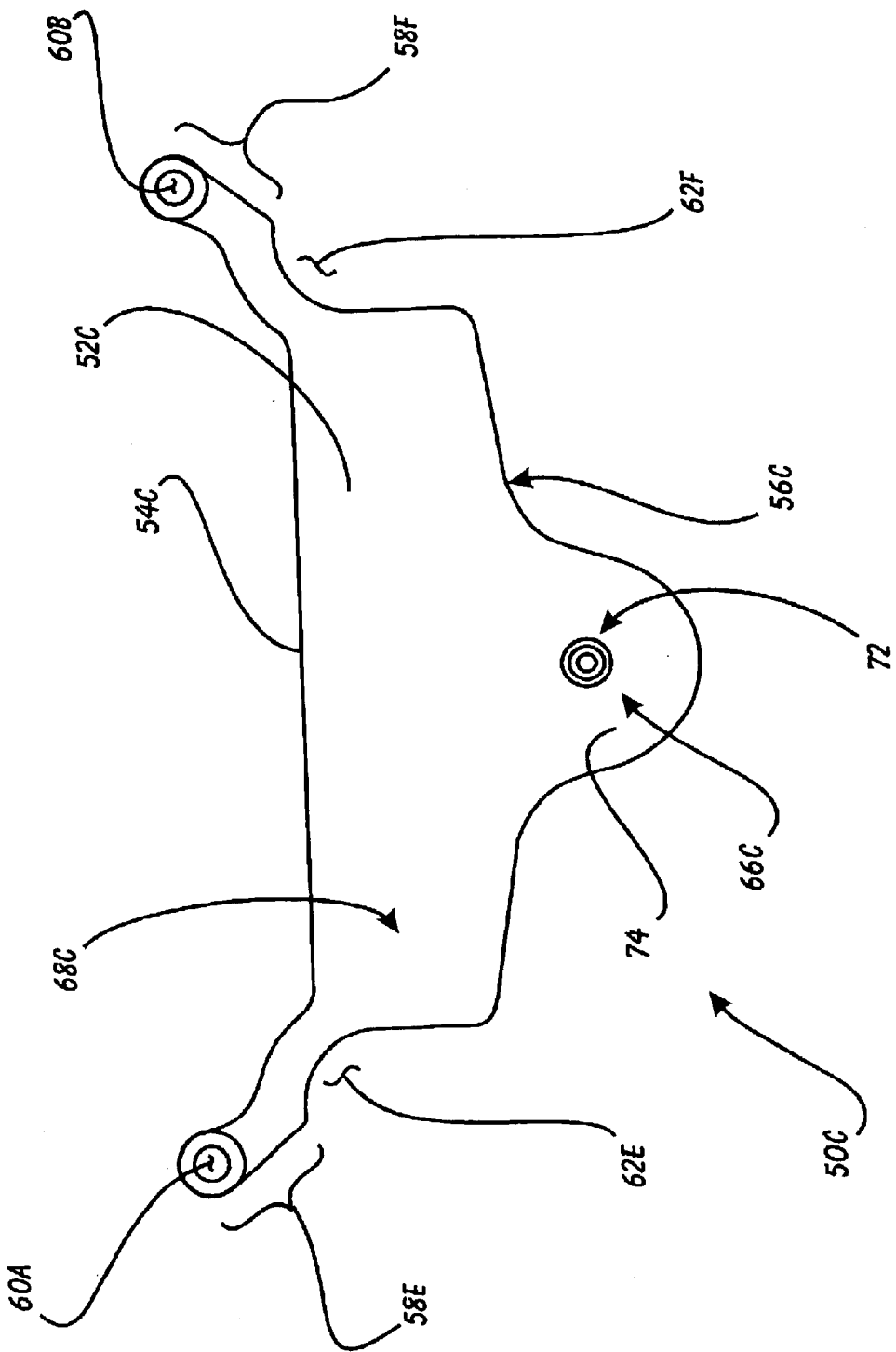
FIG. 7 is a top view of another alternate bracket of the present invention.

FIG. 7 is a top view of another alternate bracket 50C of the present invention. This design differs from those in FIGS. 4, 5 and 6 in one critical way—rather than mounting to the triple clamp using the headlight mounting bolt, this bracket 50C actually mounts to the bottom of the steering stem via a steering stem mounting bolt 72 extending upwardly from the bracket mounting aperture 66C. Rather than bracing against the steering stem, then, the bracket actually attaches to the bottom end of it; the conventional steering stern includes a threaded aperture formed therein—it is into this threaded aperture that the steering stem mounting bolt 72 engages.

In order to provide the correct location for mounting to the steering stem, the base 52C has a steering stem cap portion 74 extending from it (causing the rear face 56C to curve outwardly); the cap portion 74 will cover the bottom end of the steering stem when the bracket 50C is installed. Since the bolt of the main headlight is not used, this bracket 50C can be attached to triple clamps that do not have a headlight attached thereto.

Similar to the bracket of FIG. 5, this bracket 50C has the tube sockets 62E and 62F located in the rear face 56C. The arms 58E and 58F extend obliquely from the base portion 56C, and have mounting apertures 60A and 60B at their distal ends. As a result of the oblique extension of the arms 58, the auxiliary headlights will be positioned in front of the fork tubes, and also out to the side as well. This provides yet another unique appearance option for the user. Although not depicted here, it is expected that the bracket 50C will be provided with a wire groove (see FIGS. 5 and 6) will be provided to house the wiring. Since the bracket 50C bolts to the steering stem bottom end, there is no steering stem socket provided in this bracket 50C.

Figure 8:
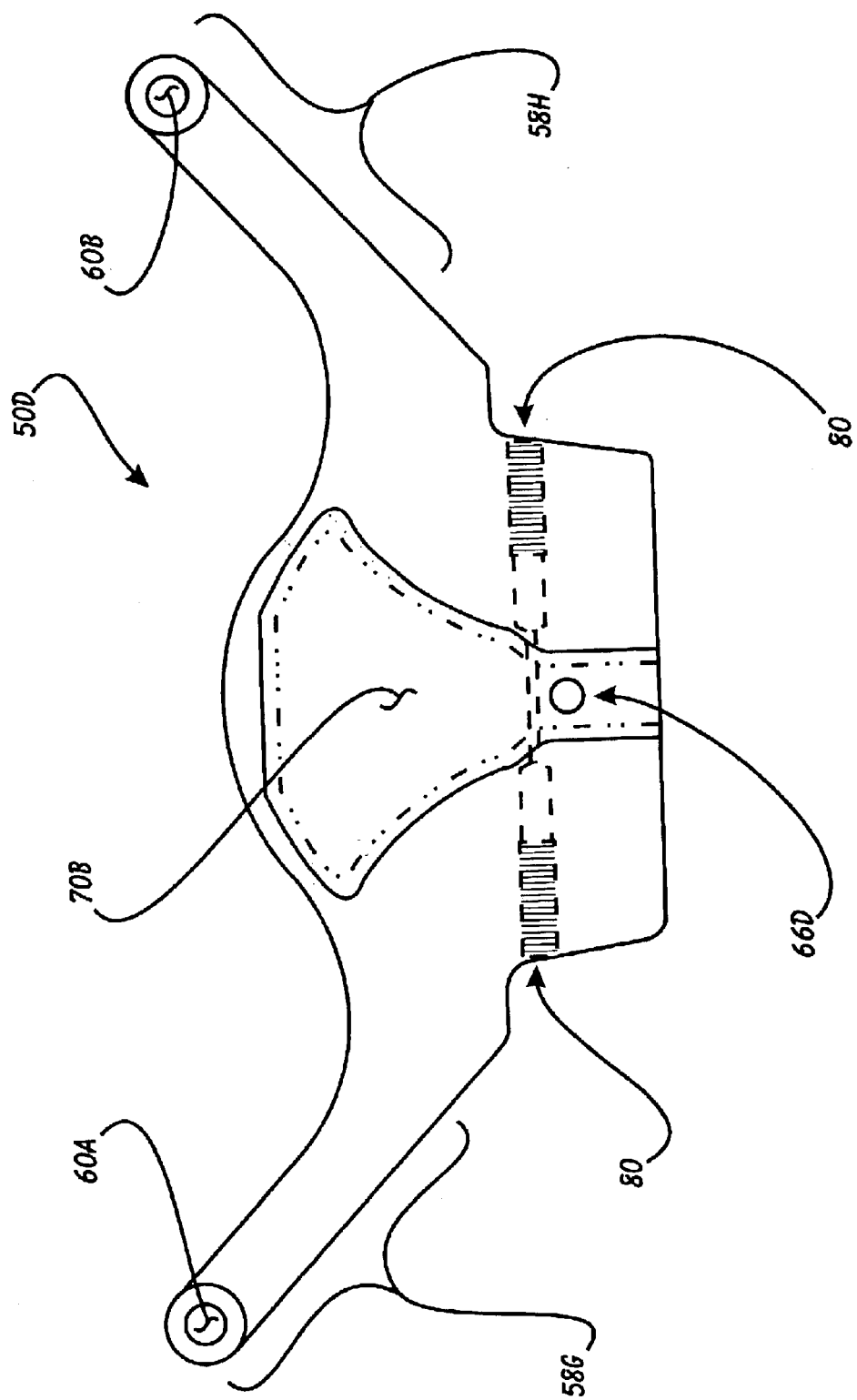
FIG. 8 is a top view of yet another alternate bracket of the present invention.

FIG. 8 is a top view of yet another version of the present invention. Similar to the embodiment of FIG. 7, this embodiment is designed to cap the bottom end of the steering stem, and attach by a bolt through the bracket mounting aperture 66D and into a threaded hole in the bottom of the steering stem (which is conventionally available).

In addition to providing yet another shape for the arms 58, this embodiment 50D has wire grooves of similar design and function as described above in connection with other embodiments. This groove 70B creates a pocket that is actually a wide, recessed area for creating a clearance for protrusions extending from the lower triple clamp. Of course, additional wiring grooves may be disbursed across the surface of the bracket 50D.

Also unique to this depiction is a brake line bore 80. The brake line bore 80 provides a stylish manifold for the front brake lines. Instead of using the stock brake lines or hoses interconnecting the handlebar-mounted brake lever and the front brake(s), the user can attach a shortened brake line between the brake lever (not shown) and the bore 80; an additional brake line is then connected between the other end of the bore 80 and the brake caliper(s) located at the front forks. In this manner, the area of the headlamp is rendered sleeker and more aesthetically pleasing, since the clutter of the brake line is substantially reduced. In most embodiments, the bore 80 is threaded at each end (depicted here by vertical lines) so that the new, short brake lines can threadedly engage them.

It should be understood that some of the mounting apertures described herein may be interchanged with mounting studs, posts or threaded bolts, in order to provide a "male" mounting gender for the lights or other external devices rather than a "female" mounting gender.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A bracket for attaching to a motorcycle fork assembly, said fork assembly defined by a pair of fork tubes in spaced relation and a triple clamp interconnecting said fork tubes, said triple clamp defining a top surface and a bottom surface, said top and bottom surfaces being substantially parallel, the bracket comprising:

a base portion, said base portion defined by at least one arcuate fork tube socket, said fork tube socket cooperatively designed to accept one said fork tube therein said base portion defined by a top surface cooperatively designed to abut said bottom surface of said triple clamp when said bracket is attached to said triple clamp; and at least one arm extending from said base portion, said arm defined by mounting means for attaching an external accessory device thereto.

2. The bracket of claim 1, wherein said base portion is defined by a pair of said fork sockets, each said socket configured to accept one said fork tube therein.

3. The bracket of claim 2, comprising two said arms extending from said base portion.

4. The bracket of claim 3, wherein each said mounting means for attaching an external accessory thereto comprises mounting aperture.

5. The bracket of claim 1, wherein said base portion is defined by a top side and a bottom side, said base portion further defined by a groove cut into said bottom side.

6. The bracket of claim 1, wherein:

said fork assembly is further defined by a main headlight attached to said triple clamp, said main headlight attached to said triple clamp by a main headlight mounting bolt; and said bracket further comprising a mounting aperture penetrating said base portion, said mounting aperture cooperatively aligned with said main headlight mounting bolt.

7. The bracket of claim 1, wherein:

said fork assembly is further defined by a steering stem in spaced relation to said fork tubes; and said base portion further comprises an arcuate steering stem socket formed therein to accept said steering stem.

8. The bracket of claim 1, wherein:

said fork assembly is further defined by a steering stem in spaced relation to said fork tubes; and said base portion further comprises a convexly arcuate steering stem cap portion protruding therefrom, said steering stem cap portion further defined by a bracket mounting aperture formed therethrough.

9. A method for attaching auxiliary headlights to a motorcycle, said motorcycle defined by a fork assembly, said fork assembly comprising at least one triple clamp said triple clamp defining a too surface and a bottom surface, said too and bottom surfaces being generally parallel to one another, a right fork tube, a left fork tube and a steering stem, said tubes in spaced relation, said method comprising the steps of:

attaching a bracket to said fork assembly by a single bolt, said bracket comprising a base portion and at least one fork tube socket, said fork tube socket comprising an arcuate portion of said base portion configured to accept one said fork tube therein, said bracket further defining a top surface and a bottom surface, said top and bottom surfaces in generally parallel spaced relation, said top and bottom surfaces defining the height of said base portion, said height being less than about two inches.

10. The method of claim 9, wherein said attaching step comprises attaching a bracket defined by a pair of said fork tube sockets, each said fork tube socket configured to accept one said fork tube therein.

11. The method of claim 10, wherein said attaching step comprises attaching a bracket defined by at least one arm extending therefrom, said arm further defined by a mounting means for attaching an auxiliary headlight thereto, said method further comprising:

an auxiliary headlight attaching step prior to said bracket attaching step, wherein an auxiliary headlight is attached to one said mounting means.

12. The method of claim 10, wherein said attaching step comprises attaching a bracket defined by at least one arm extending therefrom, said arm further defined by a mounting means for attaching an auxiliary headlight thereto, said method further comprising:

an auxiliary headlight attaching step after said bracket attaching step, wherein an auxiliary headlight is attached to one said mounting means.

13. The method of claim 10, wherein said attaching step comprises attaching a bracket further defined by a rear face of said base portion, said rear face having an arcuate steering stem socket formed therein cooperatively to accept said steering stem.

14. The method of claim 10, wherein said attaching step comprises attaching a bracket further defined by a rear face of said base portion said rear face having a steering stem cap portion extending therefrom, said steering stem cap portion further defined by a steering stem mounting means for attaching said bracket to said steering stem.

15. The bracket of claim 1, wherein said base portion is defined by a top side and a bottom side, said base portion further defined by a groove cut into said top side.

16. The bracket of claim 1, wherein said base portion is further defined by a brake line bore formed therein.

17. The method of claim 9, wherein said bracket attaching step further defines attaching a bracket defined by a base portion, said base portion having a brake line bore formed therein.

18. A bracket for attaching to a motorcycle fork assembly, said fork assembly defined by a pair of fork tubes in spaced relation and a triple clamp interconnecting said fork tubes, said triple clamp defining a top surface and a bottom surface, said top and bottom surfaces being substantially parallel, the bracket comprising:

a base portion, said base portion defined by at least one arcuate fork tube socket, said fork tube socket cooperatively designed to accept one said fork tube therein said base portion defined by a bottom surface cooperatively designed to abut said top surface of said triple clamp when said bracket is attached to said triple clamp; and at least one arm extending from said base portion, said arm defined by mounting means for attaching an external accessory device thereto.

\* \* \* \* \*